(12) United States Patent
Inoue et al.

(10) Patent No.: US 10,752,051 B2
(45) Date of Patent: Aug. 25, 2020

(54) HUB UNIT

(71) Applicant: JTEKT CORPORATION, Osaka-shi, Osaka (JP)

(72) Inventors: Yuya Inoue, Nagaokakyo (JP); Takaaki Onizuka, Kashiwara (JP); Toshihiro Hakata, Kashiwara (JP); Teruyuki Wakisaka, Nagoya (JP); Takuya Toda, Kashiwara (JP)

(73) Assignee: JTEKT CORPORATION, Osaka-shi (JO)

(*) Notice: Subject to any disclaimer, the term of this patent is extended or adjusted under 35 U.S.C. 154(b) by 0 days.

(21) Appl. No.: 16/323,052

(22) PCT Filed: Sep. 12, 2017

(86) PCT No.: PCT/JP2017/032918
§ 371 (c)(1),
(2) Date: Feb. 4, 2019

(87) PCT Pub. No.: WO2018/051986
PCT Pub. Date: Mar. 22, 2018

(65) Prior Publication Data
US 2019/0184740 A1 Jun. 20, 2019

(30) Foreign Application Priority Data

Sep. 13, 2016 (JP) .................................. 2016-178173
Aug. 18, 2017 (JP) .................................. 2017-158168

(51) Int. Cl.
*F16C 33/58* (2006.01)
*F16C 19/18* (2006.01)
(Continued)

(52) U.S. Cl.
CPC .............. *B60B 27/02* (2013.01); *B60B 35/02* (2013.01); *B60B 35/18* (2013.01); *F16C 19/186* (2013.01);
(Continued)

(58) Field of Classification Search
CPC .. F16C 19/186; F16C 33/585; F16C 2326/02; F16C 2240/34; F16C 2240/46;
(Continued)

(56) References Cited

U.S. PATENT DOCUMENTS 5,206,993 A * 5/1993 Brough ................. F16C 19/186
                                                  29/407.05
8,007,182 B2 * 8/2011 Mock .................... F16C 19/181
                                                  384/494
(Continued)

FOREIGN PATENT DOCUMENTS

CN        101278134 A        10/2008
CN        204985353 U         1/2016
(Continued)

OTHER PUBLICATIONS

Nov. 28, 2017 International Search Report issued in International Patent Application No. PCT/JP2017/032918.

(Continued)

*Primary Examiner* — Alan B Waits
(74) *Attorney, Agent, or Firm* — Oliff PLC

(57) ABSTRACT

A hub unit that is to be installed on a vehicle is provided with: an outer ring having, on the inner circumferential surface, a first outer raceway surface and a second outer raceway surface that is disposed to the outside of the first outer raceway surface in the vehicle width direction when the hub unit is installed on the vehicle; an inner shaft that is disposed on the inside of the outer ring concentrically with the outer ring and on which a wheel is installed on the outer (Continued)

end in the vehicle width direction; and an inner ring that is press-fitted to the inner shaft on the inner end in the vehicle width direction.

5 Claims, 13 Drawing Sheets

(51) Int. Cl.
| | |
|---|---|
| *B60B 27/02* | (2006.01) |
| *B60B 35/18* | (2006.01) |
| *B60B 35/02* | (2006.01) |
| *F16C 33/72* | (2006.01) |
| *B60B 27/00* | (2006.01) |

(52) U.S. Cl.
CPC .......... *F16C 33/585* (2013.01); *F16C 33/723* (2013.01); *B60B 27/0073* (2013.01); *F16C 2240/34* (2013.01); *F16C 2240/46* (2013.01); *F16C 2326/02* (2013.01)

(58) Field of Classification Search
CPC ....... F16C 33/723; B60B 27/02; B60B 35/02; B60B 35/18; B60B 27/0073
See application file for complete search history.

(56) References Cited

U.S. PATENT DOCUMENTS

| | | | |
|---|---|---|---|
| 8,616,779 B2 * | 12/2013 | Liu | ..................... B60B 27/0026 384/544 |
| 8,770,850 B2 * | 7/2014 | Ciulla | ................. B60B 27/0005 384/513 |
| 2008/0199121 A1 | 8/2008 | Komori et al. | |
| 2011/0012420 A1 * | 1/2011 | Nakagawa | ............ F16C 19/186 301/110 |

FOREIGN PATENT DOCUMENTS

| | | |
|---|---|---|
| CN | 205047671 U | 2/2016 |
| CN | 205559566 U | 9/2016 |
| JP | 2004-076892 A | 3/2004 |
| JP | 2006-022850 A | 1/2006 |
| JP | 4225006 B2 | 2/2009 |

OTHER PUBLICATIONS

Nov. 28, 2017 Written Opinion issued in International Patent Application No. PCT/JP2017/032918.
Mar. 13, 2020 Office Action issued in Chinese Patent Application No. 201780055587.8.

* cited by examiner

HUB UNIT

TECHNICAL FIELD

The present disclosure relates to a hub unit and, more particularly, to a hub unit attached to a vehicle.

BACKGROUND ART

A hub unit, which is a bearing device for a vehicle, has an inner shaft and an outer ring. An inner ring is fixed to a vehicle-side end portion of the inner shaft. In the inner shaft and the inner ring, raceway surfaces are provided on outer peripheries. In the outer ring, raceway surfaces corresponding to the raceway surfaces of the inner shaft and the inner ring are provided on an inner periphery. A bearing space is formed between the inner shaft and the outer ring and also between the inner ring and the outer ring. A plurality of rows of rolling elements are arranged in the bearing space. The bearing space is sealed by a sealing device.

The higher the rigidity of a hub unit, the better the steering feeling of a vehicle on which the hub unit is mounted. The internal rigidity of a hub unit greatly affects the rigidity of the entire hub unit.

Patent Literature 1 describes that, in a hub unit, a large radial load is applied to a rolling element on an inner side of a vehicle when the vehicle is turning. Patent Literature 1 also describes that a heating amount generated by friction increases at a contact portion between a rolling element and a raceway surface, as the rotation speed and the load weight of the hub unit increase. Therefore, in the hub unit of Patent Literature 1, a contact angle of a rolling element on an inner side is made smaller than a contact angle of a rolling element on an outer side so as to achieve an improvement in a bearing capability of the rolling element on the inner side related to a radial load and a reduction in the heating amount due to friction.

CITATION LIST

Patent Literature

[Patent Literature 1]: JP-B-4225006

SUMMARY OF INVENTION

Technical Problem

When the internal rigidity of a hub unit is improved, there is a possibility that rotational torque increases. Patent Literature 1 discloses that a heating amount converted from the rotational torque (bearing torque) is reduced by making a contact angle of a rolling element on an inner side smaller than a contact angle of a rolling element on an outer side. However, in a hub unit of Patent Literature 1, there is room for further improvement in terms of compatibility of both suppression of an increase in the rotational torque and an improvement in the rigidity.

The present disclosure provides a hub unit capable of improving rigidity while suppressing an increase in rotational torque. Further, the present disclosure provides a hub unit capable of improving a bearing life span.

A hub unit according to the present disclosure is attached to a vehicle. The hub unit includes an outer ring, an inner shaft, an inner ring, a plurality of first rolling elements, and a plurality of second rolling elements. In the outer ring, a first outer raceway surface and a second outer raceway surface are provided on an inner peripheral surface. The second outer raceway surface is disposed on a further outer side than the first outer raceway surface in a vehicle width direction in a state where the hub unit is attached to the vehicle. The inner shaft is disposed coaxially with the outer ring on an inner periphery of the outer ring and a wheel is attached to an outer side in the vehicle width direction. The inner ring is press-fitted to an inner side of the inner shaft in the vehicle width direction. In the inner ring, a first inner raceway surface is provided on an outer peripheral surface. The first inner raceway surface corresponds to the first outer raceway surface. In the inner shaft, a second inner raceway surface is provided on an outer peripheral surface. The second inner raceway surface corresponds to the second outer raceway surface. A plurality of first rolling elements are arranged in a bearing space. The plurality of first rolling elements are in contact with the first outer raceway surface and the first inner raceway surface at a contact angle less than 37°. The bearing space is formed between the outer ring and the inner shaft to which the inner ring is attached. A plurality of second rolling elements are arranged in the bearing space. The plurality of second rolling elements are in contact with the second outer raceway surface and the second inner raceway surface at a contact angle greater than 37°.

In the hub unit, the contact angle of the first rolling element disposed on the inner side in the vehicle width direction is less than 37° and the contact angle of the second rolling element disposed on the outer side in the vehicle width direction is greater than 37°. As will be described in detail below, according to the configuration, it is possible for the hub unit to improve the rigidity while suppressing an increase in the rotational torque.

In the hub unit of the embodiment, an axial clearance determined by an extent of pressing of the inner ring against the inner shaft is set to be in a range of −0.1 mm or more and −0.015 mm or less.

Therefore, it is possible to satisfy a requirement for the life span of the hub unit and improve the rigidity of the hub unit.

In the hub unit of the embodiment, an axial clearance determined by an extent of pressing of the inner ring against the inner shaft is set to be in a range of −0.065 mm or more and −0.015 mm or less.

Therefore, the life span of the hub unit can be kept high and the rigidity of the hub unit can be improved.

Advantageous Effects of Invention

According to a hub unit of the present disclosure, it is possible to improve rigidity while suppressing an increase in rotational torque.

DESCRIPTION OF EMBODIMENTS

Figure 1:
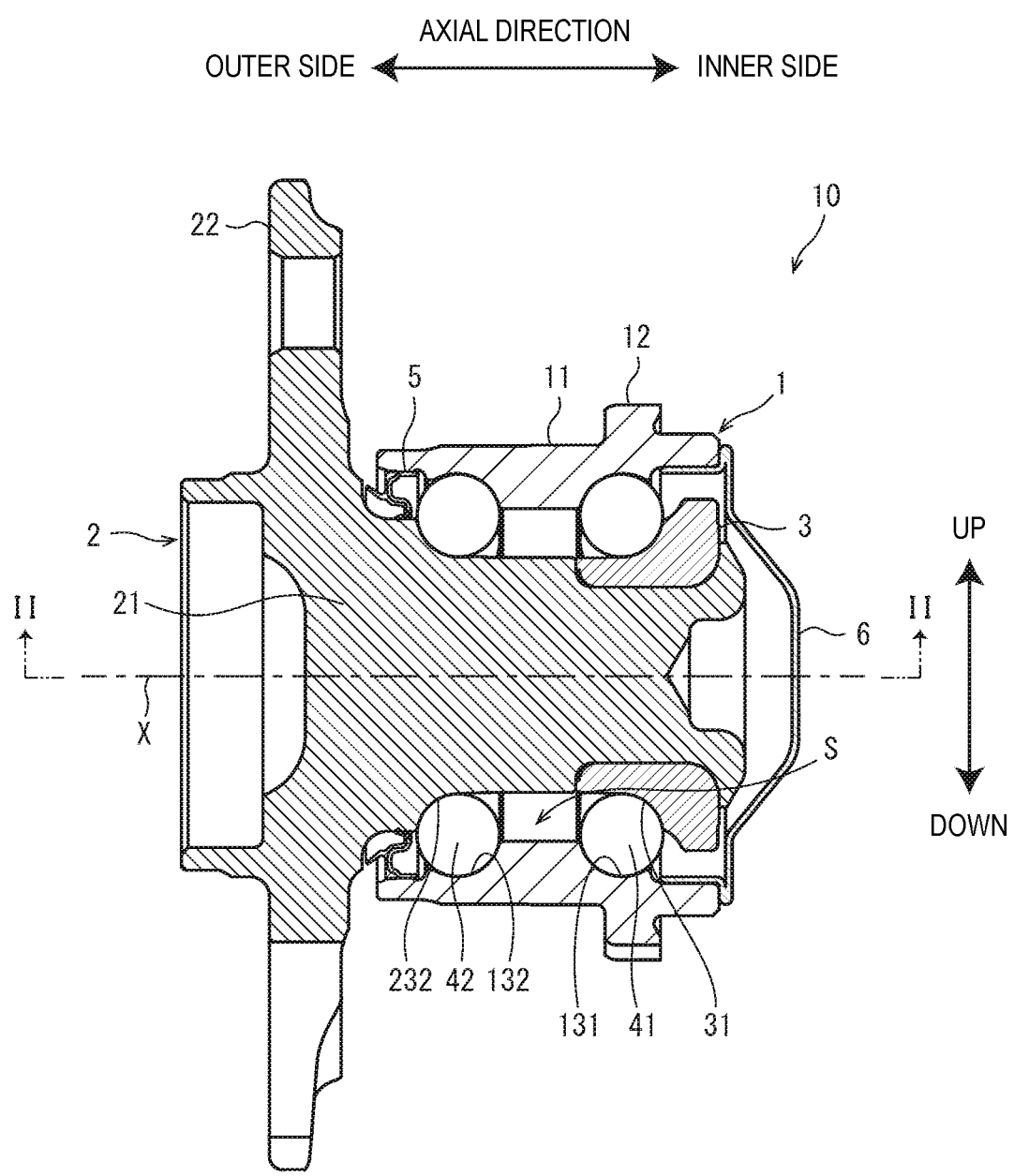
FIG. 1 is a longitudinal cross-sectional view illustrating a schematic configuration of a hub unit according to an embodiment.

Hereinafter, an embodiment will be described with reference to the drawings. Identical and corresponding components in the drawings are denoted by the same reference signs and the same description will not be repeated. For the convenience of description, in each drawing, the configuration may be simplified or schematically illustrated and also be illustrated with a part of the configuration omitted.

[Structure of Hub Unit]

FIG. 1 is a longitudinal cross-sectional view of a hub unit 10 according to an embodiment. The longitudinal cross-section means a surface when cutting with a plane passing through a straight line X which is an axial center of the hub unit 10. A transverse cross-section is a surface when cutting with a plane perpendicular to the straight line X. A direction in which the straight line X extends is an axial direction of the hub unit 10 and a vehicle width direction of a vehicle to which the hub unit 10 is attached. Hereinafter, in the axial direction of the hub unit 10, a side close to a vehicle body when the hub unit 10 is attached to the vehicle is referred to as an inner side and a side far from the vehicle body is referred to as an outer side. The upper and lower sides of the hub unit 10 when the hub unit 10 is attached to the vehicle are simply referred to as the up and down sides. A vertical direction in FIG. 1 coincides with a vertical direction of the hub unit 10.

As illustrated in FIG. 1, the hub unit 10 includes an outer ring 1, an inner shaft 2, an inner ring 3, first and second rolling elements 41 and 42, a sealing device 5, and a cap 6.

The outer ring 1 includes an outer ring main body 11 and an outer ring flange 12. In the outer ring 1, a first outer raceway surface 131 and a second outer raceway surface 132 are provided on the inner peripheral surface.

The outer ring main body 11 has a substantially cylindrical shape with the straight line X as its axial center. On the inner peripheral surface of the outer ring main body 11, the first outer raceway surface 131 and the second outer raceway surface 132 are provided. Each of the outer raceway surfaces 131 and 132 is an annular surface with the straight line X as its axial center. The first outer raceway surface 131 is disposed closer to the inner side than the second outer raceway surface 132.

The outer ring flange 12 protrudes radially outward from an outer peripheral surface of the outer ring main body 11. The outer ring flange 12 forms a substantially annular shape with the straight line X as its axial center. A suspension device 7 (described below with reference to FIGS. 6 to 9) of the vehicle is attached to the outer ring flange 12.

The inner shaft 2 is inserted into the outer ring 1. The inner ring 3 is mounted on the inner-side end portion of the inner shaft 2. In the inner ring 3, a first inner raceway surface 31 corresponding to the first outer raceway surface 131 is provided on the outer peripheral surface. In the inner shaft 2, a second inner raceway surface 232 corresponding to the second outer raceway surface 132 is provided on the outer peripheral surface.

The inner shaft 2 includes an inner shaft main body 21 and an inner shaft flange 22. The inner shaft main body 21 forms a substantially cylindrical shape with the straight line X as its axial center. The inner shaft main body 21 is inserted into the outer ring main body 11. The inner shaft main body 21 is arranged coaxially with the outer ring main body 11. The second inner raceway surface 232 is provided on the outer peripheral surface of the inner shaft main body 21. The second inner raceway surface 232 is an annular surface with the straight line X as its axial center. The second inner raceway surface 232 faces the second outer raceway surface 132.

The inner shaft flange 22 protrudes radially outward from the outer peripheral surface of the inner shaft main body 21. The inner shaft flange 22 forms a substantially annular shape with the straight line X as its axial center. A disk wheel, a brake disk, or the like is attached to the inner shaft flange 22. A brake disk 9 attached to the inner shaft flange 22 will be described below with reference to FIGS. 6 to 9.

The inner ring 3 forms a cylindrical shape with the straight line X as its axial center. The inner ring 3 is fixed to the inner shaft main body 21. The inner-side end portion of the inner shaft main body 21 is caulked radially outward and is in contact with the inner-side end surface of the inner ring 3. That is, the inner ring 3 is caulked and fixed to the inner shaft main body 21. However, the inner ring 3 may be fixed to the inner shaft main body 21 by press-fitting the inner shaft main body 21 against the inner ring 3.

The first inner raceway surface 31 is provided on the outer peripheral surface of the inner ring 3. The first inner raceway surface 31 is an annular surface with the straight line X as its axial center. The first inner raceway surface 31 is disposed closer to the inner side than the second inner raceway surface 232. The first inner raceway surface 31 faces the first outer raceway surface 131.

A bearing space S is formed between the outer ring 1 and the inner shaft 2 and the inner ring 3. A plurality of first rolling elements 41 and a plurality of second rolling elements 42 are arranged in the bearing space S. The plurality of first rolling elements 41 are arranged annularly around the straight line X as the center. The plurality of second rolling elements 42 are arranged annularly around the straight line X as the center. The first rolling element 41 is disposed closer to the inner side than the second rolling element 42.

The first rolling element 41 is disposed in contact with the first outer raceway surface 131 and the first inner raceway surface 31. The second rolling element 42 is disposed in contact with the second outer raceway surface 132 and the second inner raceway surface 232. The contact angle of the second rolling element 42 on the outer side is greater than that of the first rolling element 41 on the inner side. The contact angles of the first and second rolling elements 41 and 42 will be described below.

The sealing device 5 forms a substantially annular shape with the straight line X as its axial center. The sealing device 5 is attached between the outer ring main body 11 and the inner shaft main body 21. The sealing device 5 seals the outer-side end portion of the bearing space S. The inner-side end portion of the bearing space S is sealed by the cap 6.

Figure 2:
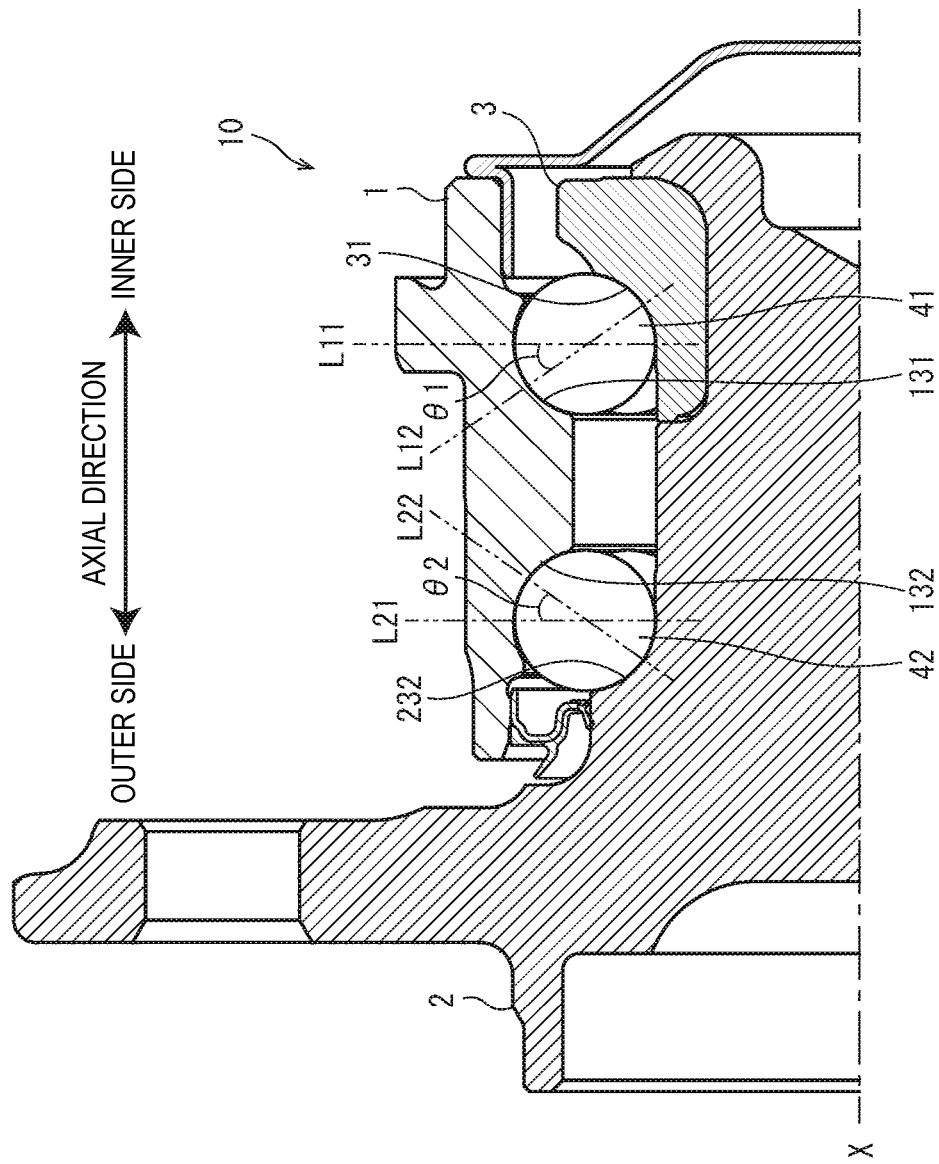
FIG. 2 is an enlarged view of an II-II portion of the hub unit illustrated in FIG. 1.

FIG. 2 is an enlarged view of an upper portion (II-II portion) of the hub unit 10 illustrated in FIG. 1. As illustrated in FIG. 2, the first and second rolling elements 41 and 42 have contact angles θ1 and θ2, respectively. The first rolling element 41 is in contact with the first outer raceway surface 131 and the first inner raceway surface 31 at the contact angle θ1. The second rolling element 42 is in contact with the second outer raceway surface 132 and the second inner raceway surface 232 at the contact angle θ2.

The hub unit 10 is a bearing device of a rear arrangement. That is, in the hub unit 10, the rear surfaces of the first and second outer raceway surfaces 131 and 132 are close to each other. The contact angle θ1 of the first rolling element 41 is an angle inclined toward the second rolling element 42 with respect to a plane perpendicular to the axial center X of the hub unit 10. The contact angle θ2 of the second rolling element 42 is an angle inclined toward the first rolling element 41 with respect to a plane perpendicular to the axial center X of the hub unit 10.

In the longitudinal cross-section of the hub unit 10, the contact angle θ1 of the first rolling element 41 is an angle formed by a straight line L11 and s straight line L12. In the longitudinal cross-section of the hub unit 10, the straight line L11 passes through the center of the first rolling element 41 and extends perpendicular to the axial center X of the hub unit 10. In the longitudinal cross-section of the hub unit 10, the straight line L12 passes through a contact point between the first outer raceway surface 131 and the first rolling element 41 and intersects the straight line L11 at the center of the first rolling element 41. A direction in which the straight line L12 extends is a direction of a load acting between the outer ring 1 and the inner ring 3 and the first rolling element 41.

In the longitudinal cross-section of the hub unit 10, the contact angle θ2 of the second rolling element 42 is an angle formed by a straight line L21 and a straight line L22. In the longitudinal cross-section of the hub unit 10, the straight line L21 passes through the center of the second rolling element 42 and extends perpendicular to the axial center X of the hub unit 10. In the longitudinal cross-section of the hub unit 10, the straight line L22 passes through a contact point between the second outer raceway surface 132 and the second rolling element 42 and intersects the straight line L21 at the center of the second rolling element 42. A direction in which the straight line L22 extends is a direction of a load acting between the outer ring 1 and the inner shaft 2 and the second rolling element 42.

Figure 3:
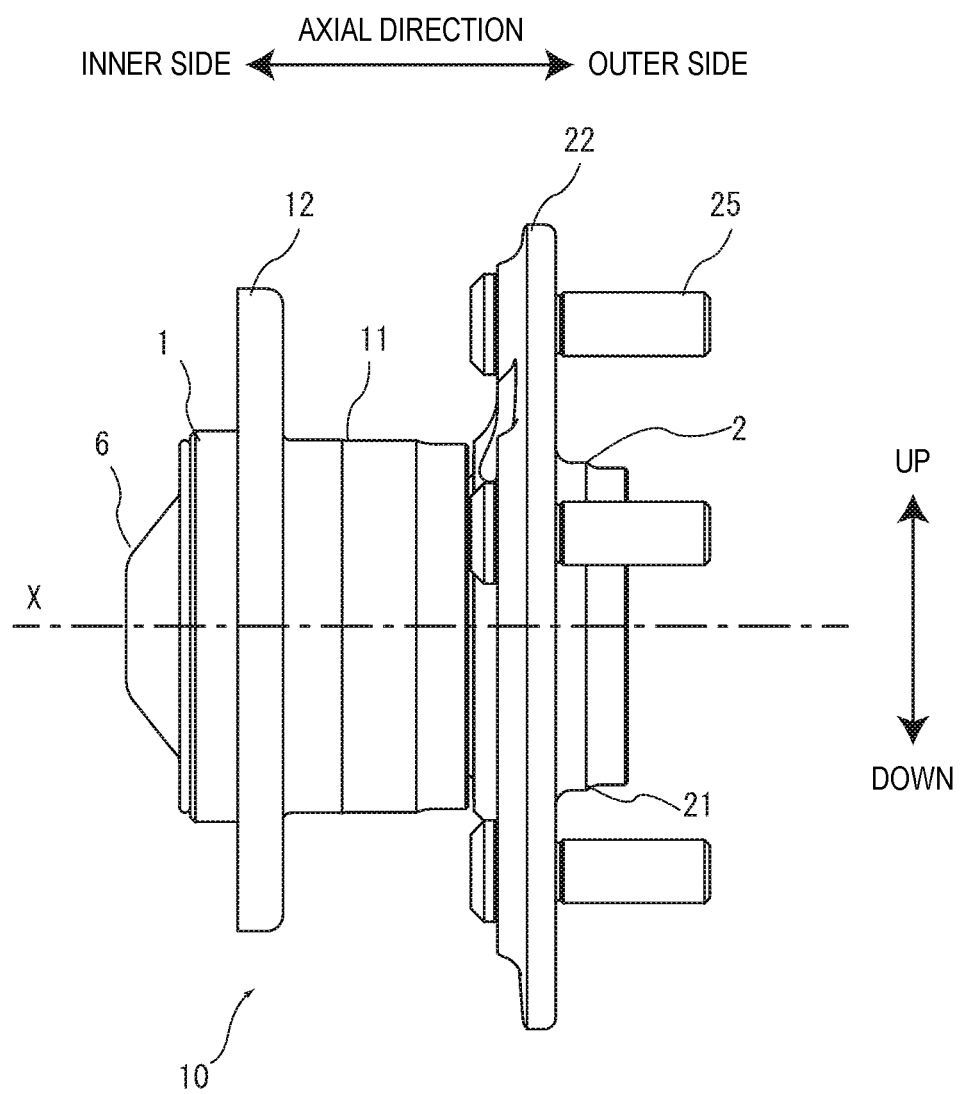
FIG. 3 is a side view of the hub unit according to the embodiment.

FIG. 3 is a side view of the hub unit according to the embodiment. As illustrated in the drawing, the outer ring main body 11 forms a substantially cylindrical shape with the straight line X as its axial center. On the inner side of the outer ring main body 11, the outer ring flange 12 extends outward in a radial direction of the hub unit 10. The inner shaft main body 21 also forms a substantially cylindrical shape with the straight line X as its axial center. In the inner shaft main body 21, the inner shaft flange 22 extends outward in the radial direction of the hub unit 10. A plurality of bolts 25, 25, . . . are inserted in the inner shaft flange 22. The disk wheel or the disk brake 9 is attached to the inner shaft flange 22 by the bolts 25, 25, . . . .

Figure 4:
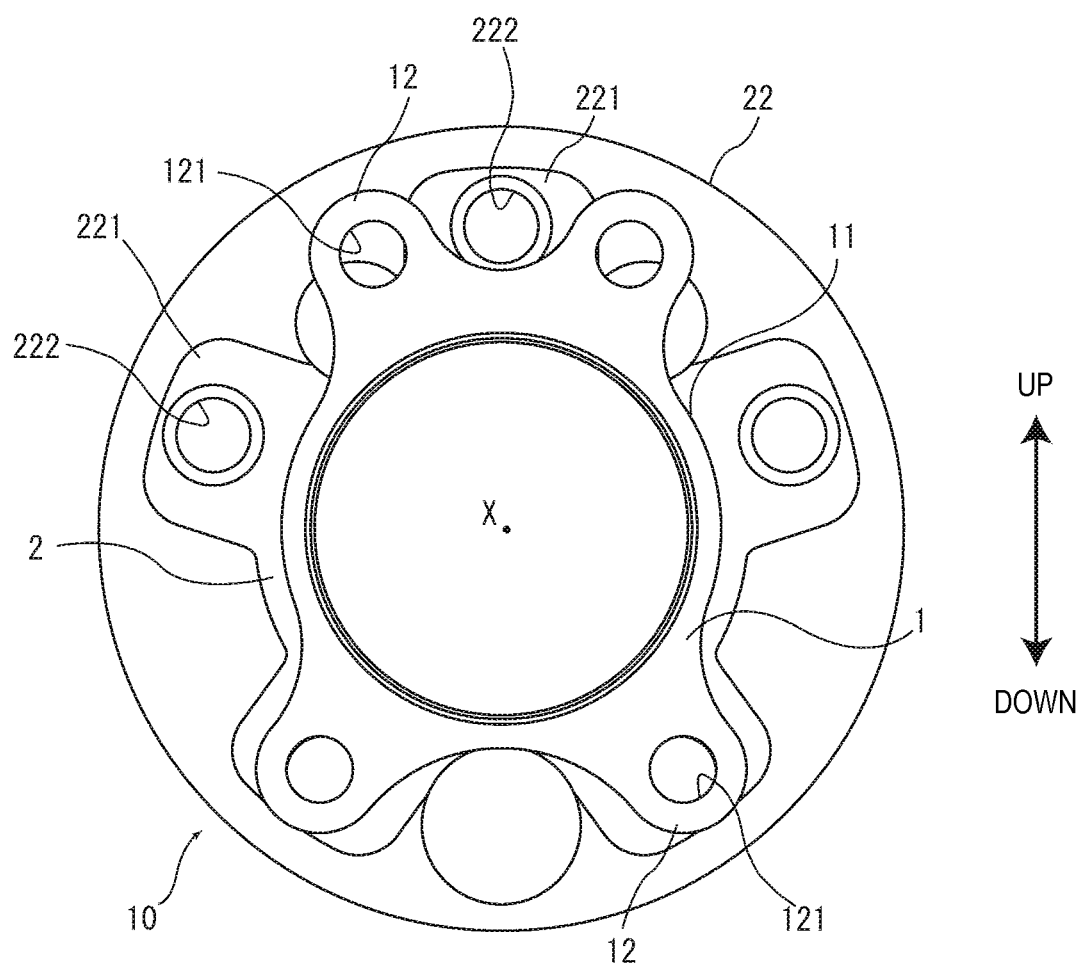
FIG. 4 is a view of the hub unit according to the embodiment as seen from an inner side in an axial direction.

FIG. 4 is a view of the hub unit 10 according to the embodiment as seen from the inner side in an axial direction. As illustrated in the drawing, in the outer ring main body 11, two outer ring flanges 12 and 12 are attached to the upper portion and two outer ring flanges 12 and 12 are attached to the lower portion. The outer ring flange 12 is provided with a bolt insertion hole 121.

As illustrated in FIG. 4, the inner shaft flange 22 has a substantially circular shape when viewed from the axial direction. Ribs 221 are formed at equal intervals in a circumferential direction at positions slightly inside from the outer end in the radial direction of the inner shaft flange 22. A plurality of bolt insertion holes 222, 222, . . . are formed in the ribs 221. In vicinities where the bolt insertion holes 222 are formed, the axial thickness of the inner shaft flange 22 is reinforced by the ribs 221. The bolt 25 described above is inserted into the bolt insertion hole 222.

Figure 5:
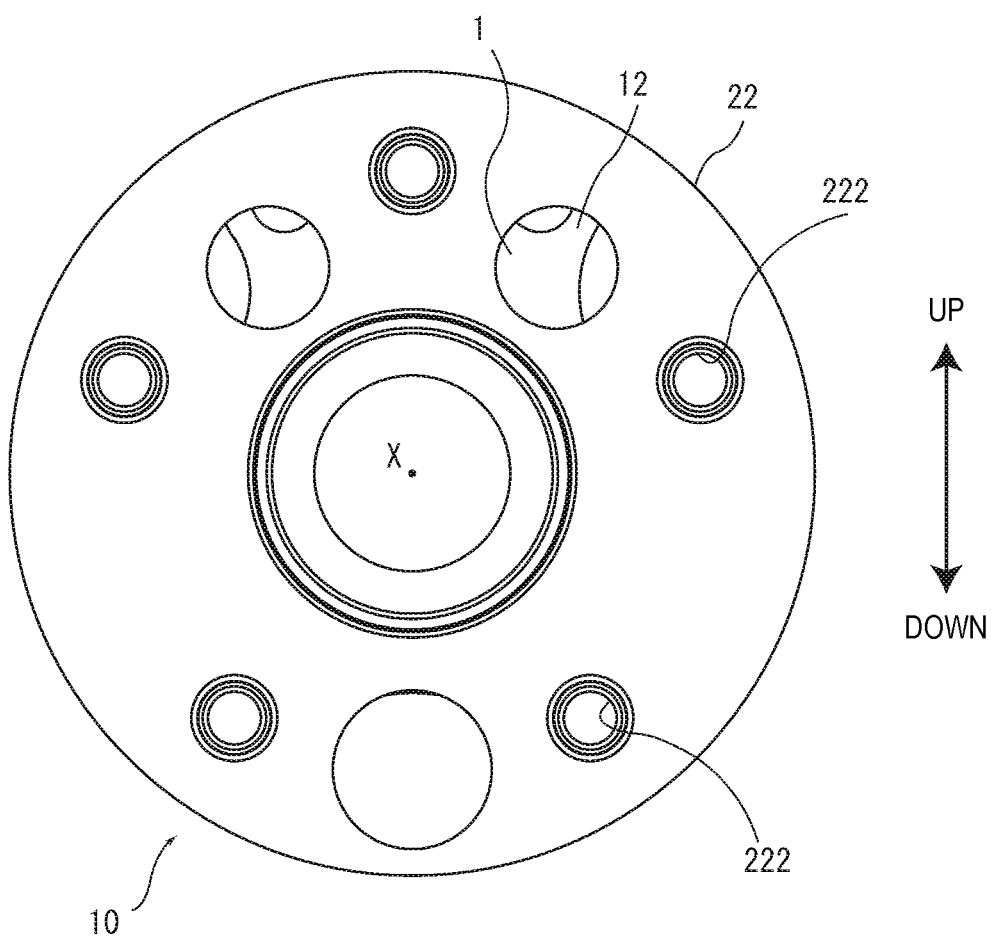
FIG. 5 is a view of the hub unit according to the embodiment as seen from an outer side in the axial direction.

FIG. 5 is a view of the hub unit 10 according to the embodiment as seen from the outer side in the axial direction. As also illustrated in FIG. 5, the inner shaft flange 22 has a substantially circular shape when viewed from the axial direction. The rib 221 provided on the inner shaft flange 22 described above is not provided on the outer-side surface. The above-described plurality of bolt insertion holes 222, 222, . . . are formed at equal intervals in the circumferential direction on the outer-side surface.

Figure 6:
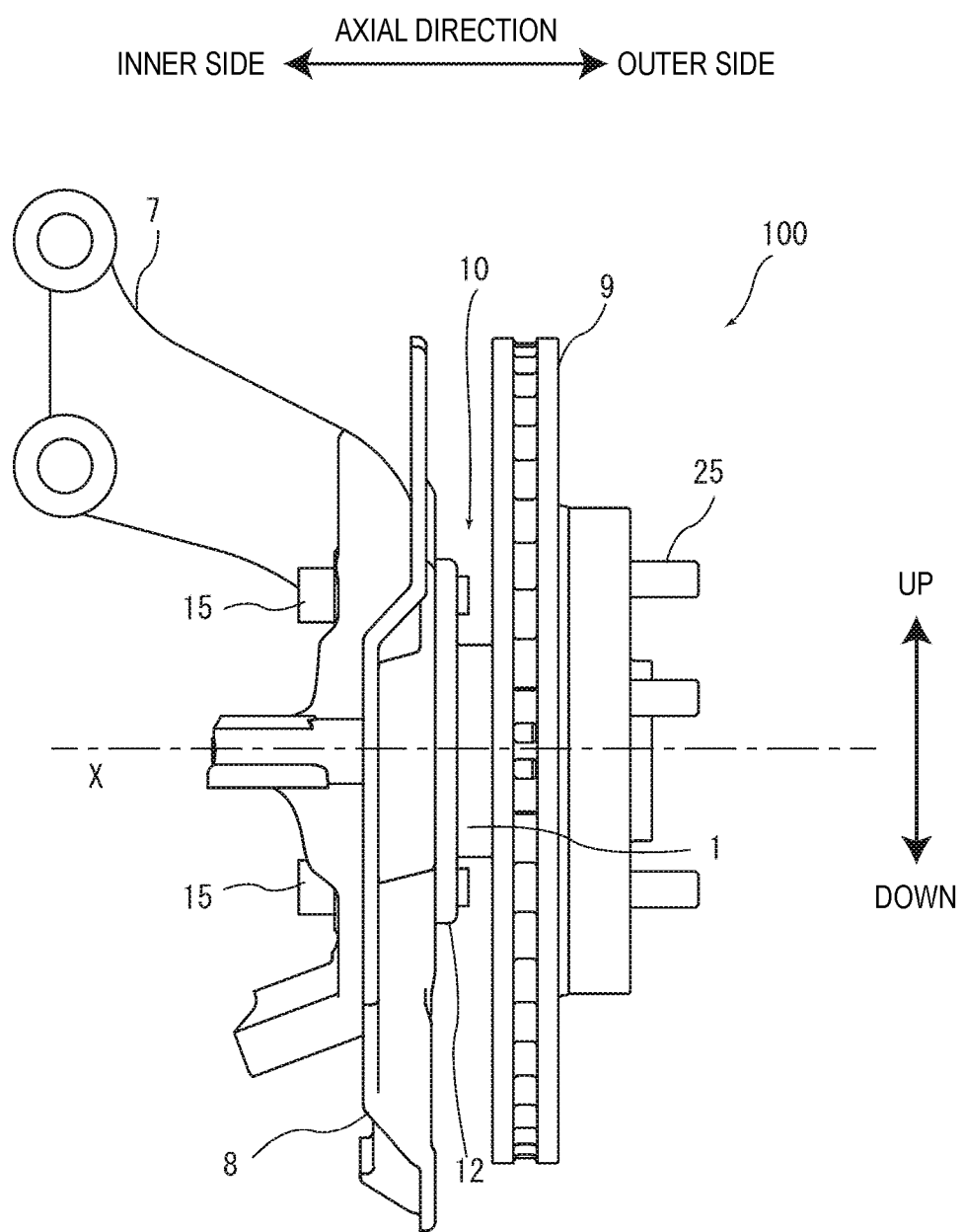
FIG. 6 is a view of an assembly in which a suspension device and a brake disk of a vehicle are assembled to the hub unit according to the embodiment as seen from a vehicle rear side.

FIG. 6 is a view of an assembly 100 in which the suspension device 7 and the brake disk 9 of the vehicle are assembled to the hub unit 10 according to the embodiment as seen from a vehicle rear side. As illustrated in the drawing, the suspension device 7 is attached to the inner side of the assembly 100. The suspension device 7 is fixed to the outer ring 1 by bolts 15, 15, . . . inserted in the bolt insertion holes 121 provided in the outer ring flange 12 illustrated in FIG. 4.

As illustrated in FIG. 6, a dust cover 8 is attached to the inner side of the assembly 100. The dust cover 8 is fixed to the outer ring 1 by the bolts 15, 15, . . . inserted into the bolt insertion holes 121 provided in the outer ring flange 12 illustrated in FIG. 4.

As illustrated in FIG. 6, the brake disk 9 is attached to the outer side of the assembly 100. The brake disk 9 is fixed to the inner shaft 2 by bolts 25, 25, . . . inserted into the bolt insertion holes 221 provided in the inner shaft flange 22 illustrated in FIGS. 4 and 5.

Figure 7:
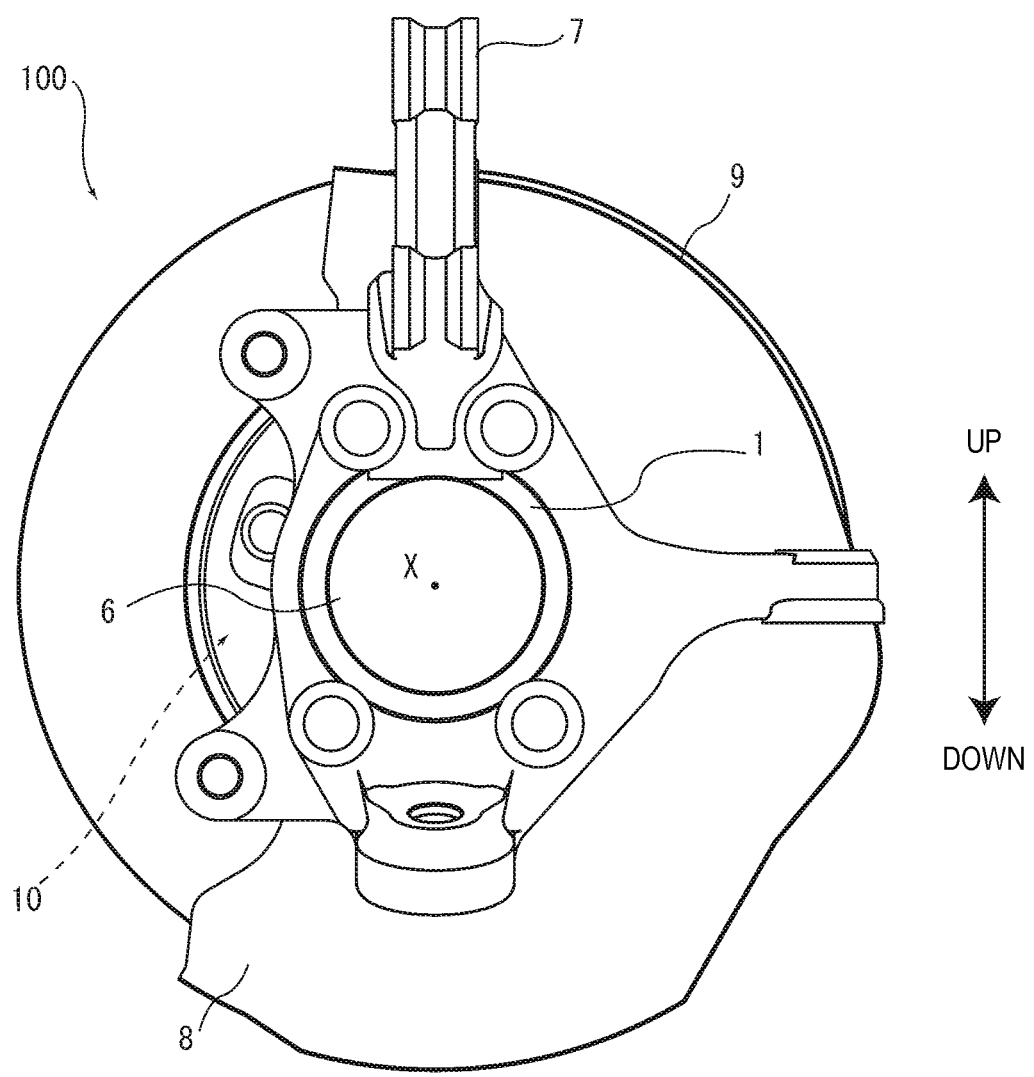
FIG. 7 is a view of the assembly in which the suspension device and the brake disk of the vehicle are assembled to the hub unit according to the embodiment as seen from an inner side in the axial direction.

FIG. 7 is a view of the assembly 100 in which the suspension device 7 and the brake disk 9 of the vehicle are assembled to the hub unit 10 according to the embodiment as seen from the inner side in the axial direction. As illustrated in the drawing, the dust cover 8 covers the rear side (the right side in the drawing is the rear side of the vehicle) of the vehicle, but the brake disk 9 is exposed on the front side of the vehicle. A brake shoe (not illustrated) is attached to a portion where the dust cover 8 is not provided.

Figure 8:
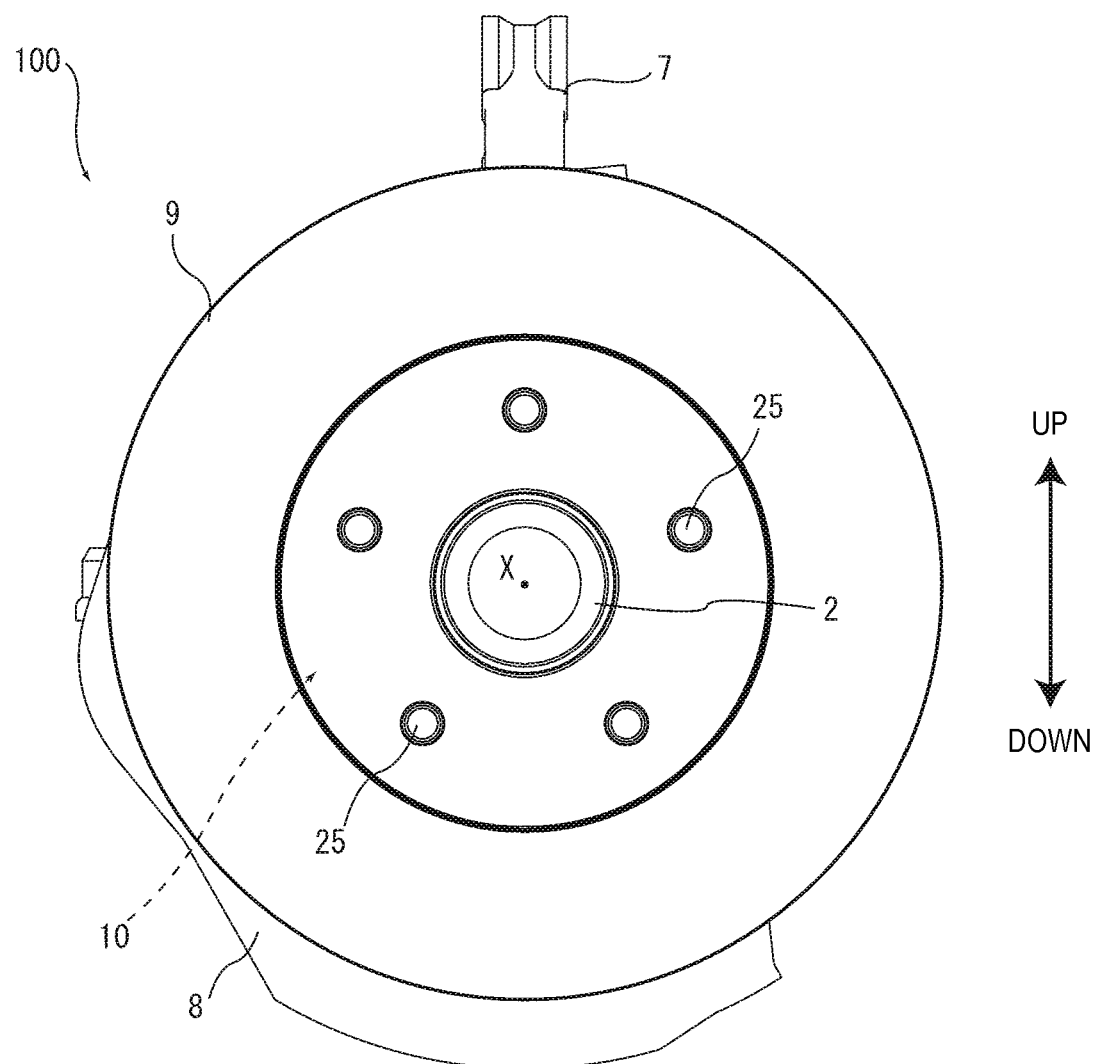
FIG. 8 is a view of the assembly in which the suspension device and the brake disk of the vehicle are assembled to the hub unit according to the embodiment as seen from an outer side in the axial direction.

FIG. 8 is a view of the assembly 100 in which the suspension device 7 and the brake disk 9 of the vehicle are assembled to the hub unit 10 according to the embodiment as seen from the outer side in the axial direction. The brake disk 9 is attached to the inner shaft flange 22 by the bolts 25, 25, . . . provided at equal intervals in the circumferential direction.

Figure 9:
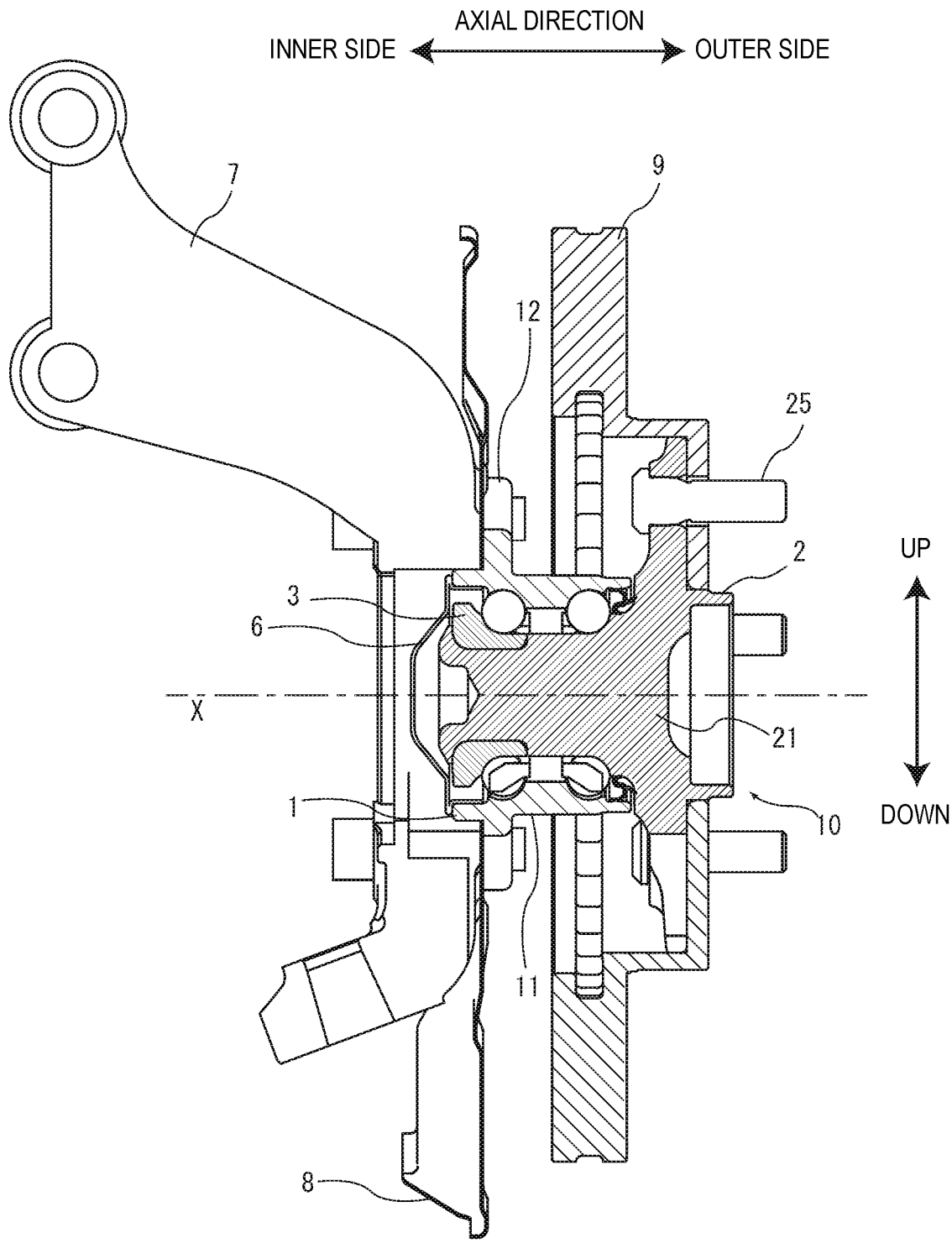
FIG. 9 is a cross-sectional view of the assembly in which the suspension device and the brake disk of the vehicle are attached to the hub unit according to the embodiment as seen from the vehicle rear side.

FIG. 9 is a cross-sectional view of the assembly 100 in which the suspension device 7 and the brake disk 9 of the vehicle are attached to the hub unit 10 according to the embodiment as seen from the vehicle rear side. As illustrated in the drawing, the brake disk 9 is attached so as to cover the outer side of the outer ring 1 and the outer shaft 2. An outer-side end portion of the brake disk 9 is attached to the inner shaft 2 by the bolts 25, 25, . . . . The suspension device 7 is attached so as to be in contact with the inner-side surface of the outer ring flange 12. The dust cover 8 is also attached so as to be in contact with the inner-side surface of the outer ring flange 12.

FIG. 2 is referred to again. The contact angle $\theta 1$ of the first rolling element 41 is set to be smaller than 37°. The contact angle $\theta 2$ of the second rolling element 42 is set to be greater than 37°. The reason thereof will be described below.

In order to determine the optimum range of the contact angles $\theta 1$ and $\theta 2$, the present inventors and the like performed calculations based on the bearing theory based on Helz contact. Specifically, the value of the contact angle $\theta 2$ of the second rolling element 42 on the outer side is changed while the value of the contact angle $\theta 1$ of the first rolling element 41 on the inner side is fixed, and the flange inclination angle and the rotational torque at each value of the contact angle $\theta 2$ are calculated. In addition, the value of the contact angle $\theta 1$ of the first rolling element 41 on the inner side is changed while the value of the contact angle $\theta 2$ of the second rolling element 42 on the outer side is fixed and the flange inclination angle and the rotational torque at each value of the contact angle $\theta 1$ are calculated. The flange inclination angle is a relative inclination angle between the outer ring flange 12 and the inner shaft flange 22 and is generally used as an index indicating the rigidity of the hub unit 10.

Table 1 shows the conditions used for calculation. In Table 1, the number of the first rolling elements 41 and the number of the second rolling elements 42 are respectively eleven and the pitch circle diameter (PCD), the ball diameter, and the material are common to the first rolling element 41 and the second rolling element 42.

TABLE 1

| Rolling element (41, 42) | Number of Balls | 11 × 2 rows |
| --- | --- | --- |
| | Distance between Ball Centers | 25 [mm] |
| | Pitch Circle Diameter (PCD) | 49 [mm] |
| | Ball Diameter | 12.7 [mm] |
| | Material | SUJ2 |
| Outer Ring (1) | Material | S55C |
| Inner Shaft (2) | Material | S55C |
| Inner Ring (3) | Material | SUJ2 |

Figure 10:
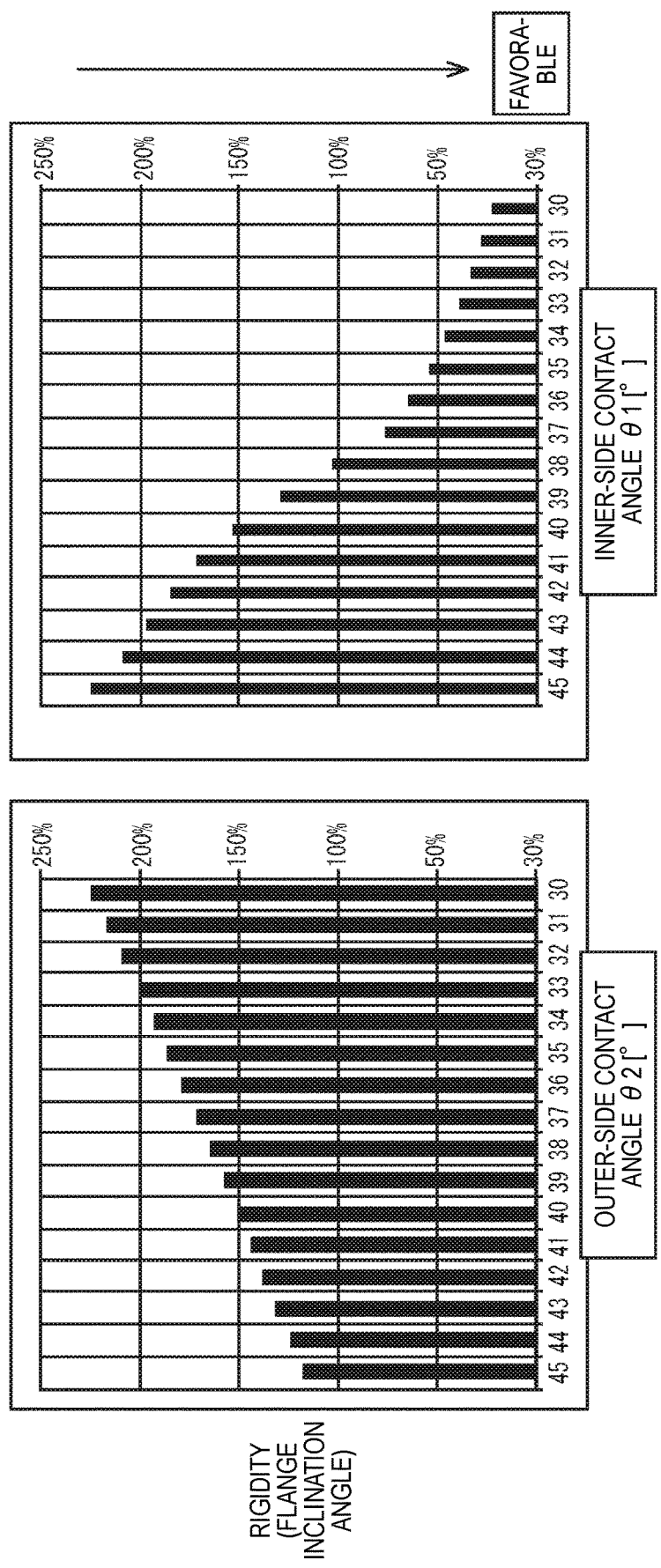
FIG. 10 is a graph illustrating a relationship between contact angles of respective rolling elements on an outer side and an inner side of the vehicle and rigidity of the hub unit.
Figure 11:
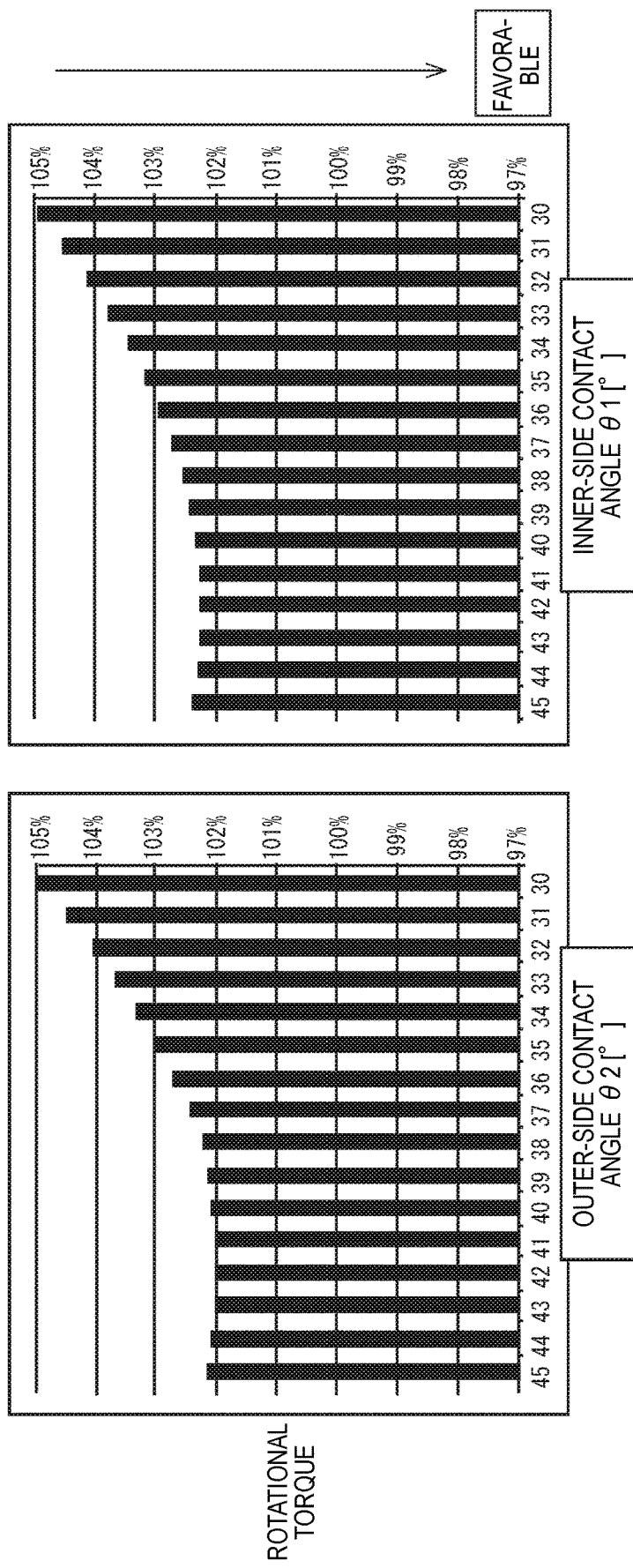
FIG. 11 is a graph illustrating a relationship between contact angles of respective rolling elements on the outer side and the inner side of the vehicle and rotational torque of the hub unit.

FIG. 10 is a graph illustrating the relationship between each of the contact angles $\theta 1$ and $\theta 2$ and the rigidity (flange inclination angle) of the hub unit 10. FIG. 11 is a graph illustrating the relationship between each of the contact angles $\theta 1$ and $\theta 2$ and the rotational torque of the hub unit 10. In FIGS. 10 and 11, the flange inclination angle and rotational torque are respectively indicated by the ratio [%] to the reference value.

As illustrated in FIG. 10, the rigidity of the hub unit 10 tends to improve as the contact angle $\theta 1$ of the first rolling element 41 on the inner side is reduced. When the contact angle $\theta 1$ is set to be less than 37°, the change in the rigidity is gradual. Therefore, it can be said that, in order to ensure high rigidity stably, the contact angle $\theta 1$ of the first rolling element 41 is preferably set to be less than 37°. Even though it is good that the contact angle $\theta 1$ of the first rolling element 41 may be set to be less than 37°, preferably 20° or more.

The rigidity of the hub unit 10 increases as the contact angle $\theta 2$ of the second rolling element 42 on the outer side increases. Therefore, from the viewpoint of improving the rigidity, the larger the contact angle $\theta 2$, the better. However, in practical terms, the contact angle $\theta 2$ is set to be 70° or less.

As illustrated in FIG. 11, the rotational torque of the hub unit 10 is reduced as the contact angle $\theta 2$ of the second rolling element 42 on the outer side increases. Then, when the contact angle $\theta 2$ exceeds 37°, the rotational torque becomes almost constant. Therefore, it can be said that it is preferable that the contact angle $\theta 2$ of the second rolling element 42 be set to be larger than 37° to obtain the reduction effect of the rotational torque.

The rotational torque tends to increase as the contact angle $\theta 1$ on the inner side is reduced. As described above, in order to obtain favorable rigidity, it is necessary to make the contact angle $\theta 1$ smaller than 37°. However, as a result, even when the rotational torque increases, which is offset by the reduction effect of the rotational torque obtained by making the contact angle $\theta 2$ on the outer side larger than 37°. Therefore, it is possible to suppress an increase in rotational torque.

As described above, the hub unit 10 according to the embodiment can improve the rigidity of the hub unit 10 while suppressing an increase in the rotational torque by adjusting the contact angles of the first rolling element 41 and the second rolling element 42. In the hub unit 10 according to the embodiment, the rigidity, the rotational torque, and the life span of the hub unit 10 are optimized by adjusting an axial clearance as will be described further below.

The axial clearance of the hub unit 10 is determined by the extent to which the inner ring 3 is pressed against the inner shaft 2. Due to the extent to which the inner ring 3 is pressed against the inner shaft 2 in the axial direction, the rolling element 41 receives pressure by the inner ring 3. The pressure received by the rolling element 41 is transmitted to the outer ring 1 via the raceway surface 131. The pressure received by the outer ring 1 via the raceway surface 131 is transmitted to the rolling element 42 via the raceway surface 132. The pressure received by the rolling element 42 is transmitted to the inner shaft 2. As described above, pressures are applied to the outer ring 1, the inner shaft 2, and the rolling elements 41 and 42 by the extent of pressing of the inner ring 3 and those are equalized and affect the rigidity or the rotational torque of the entire hub unit 10. As the extent of pressing of the inner ring 3 against the inner shaft 2 becomes larger, the axial clearance becomes smaller.

Figure 12:
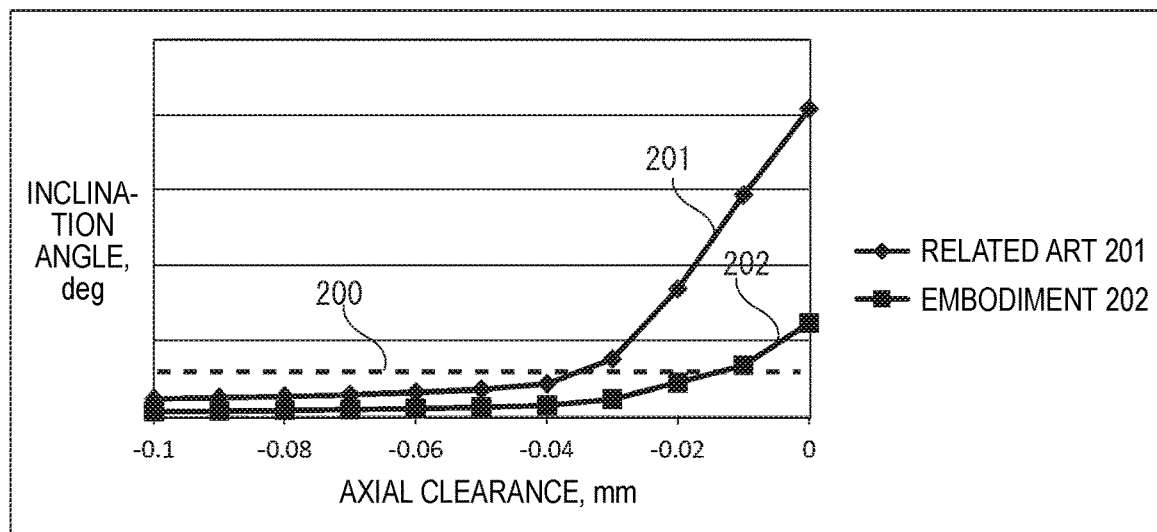
FIG. 12 is a graph illustrating a relationship between an axial clearance and an inclination angle.

FIG. 12 is a graph illustrating the relationship between the axial clearance and the inclination angle. The inclination angle is the relative inclination angle (flange inclination angle) between the outer ring flange 12 and the inner shaft flange 22. In the drawing, a graph 201 shows the relationship between the axial clearance and the inclination angle of the hub unit of the related art. In the drawing, a graph 202 shows the relationship between the axial clearance and the inclination angle of the hub unit 10 of the embodiment. The hub unit 10 of the embodiment indicates a hub unit in which the suppression of the increase of the rotational torque and the improvement of the rigidity are realized by adjusting the contact angles of the first rolling element 41 and the second rolling element 42 as described above.

Regarding the hub unit of the related art, as can be seen from the graph 201, when the axial clearance becomes greater than −0.035 mm (approaching 0), the change amount of the inclination angle abruptly increases. Here, when the hub unit 10 is assembled, it is necessary to consider the clearance tolerance. In the hub unit of the related art, when the axial clearance becomes greater than −0.035 mm, the change amount in the inclination angle becomes large, so the variation in product performance becomes large. Therefore, in the hub unit of the related art, it is necessary to reduce the axial clearance so that the axial clearance does not become greater than −0.035 mm even when the clearance tolerance is considered. That is, in the related art, it is necessary to design the axial clearance to be smaller by a clearance tolerance than −0.035 mm.

On the other hand, as can be seen from the graph 202, in the hub unit 10 of the embodiment, the change amount of the inclination angle is small even when the axial clearance becomes greater than −0.035 mm. In the hub unit 10 of the embodiment, the axial clearance can be increased to −0.015 mm. An allowable line 200 in FIG. 12 illustrates an allowable limit of the variation of the inclination angle. In the hub unit of the related art, −0.035 mm is the limit, whereas, in the hub unit 10 of the embodiment, the axial clearance can be increased to −0.015 mm.

Figure 13:
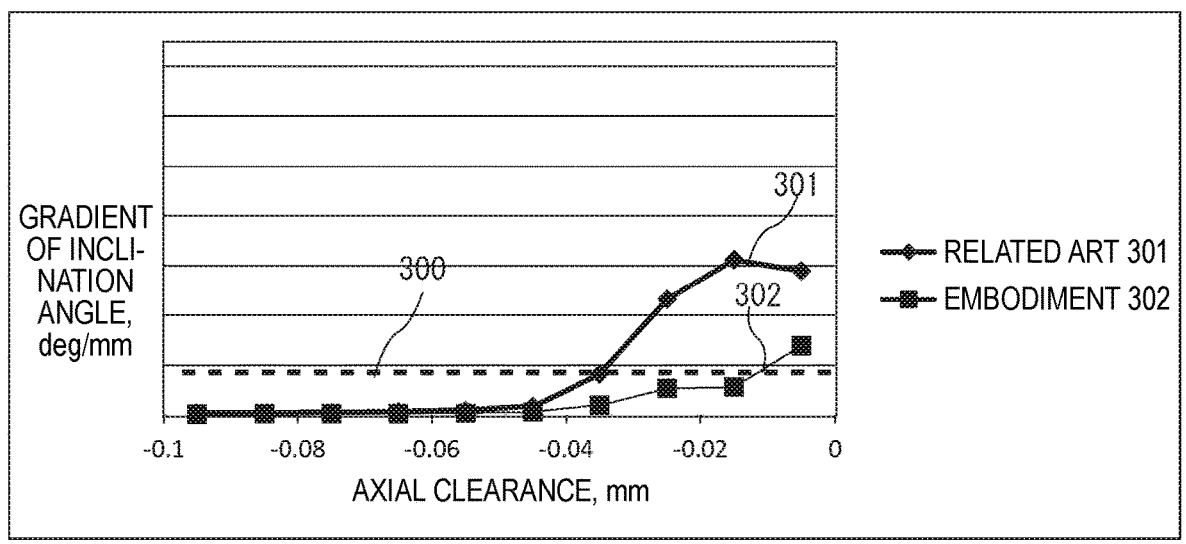
FIG. 13 is a graph illustrating a relationship between the axial clearance and a gradient of the inclination angle.

FIG. 13 is a graph illustrating the relationship between the axial clearance and a gradient of the inclination angle. A graph 301 in the drawing shows the gradient of the graph 201 in FIG. 12. A graph 302 in the drawing shows the gradient of the graph 202 in FIG. 12. An allowable line 300 in FIG. 13 shows an allowable limit as a gradient of the inclination angle. The region where the gradient of the inclination angle is large is a region where variation in product performance becomes large considering the tolerance. In the hub unit of the related art, −0.035 mm is the limit, whereas, in the hub unit 10 of the embodiment, the axial clearance can be increased to −0.015 mm.

Figure 14:
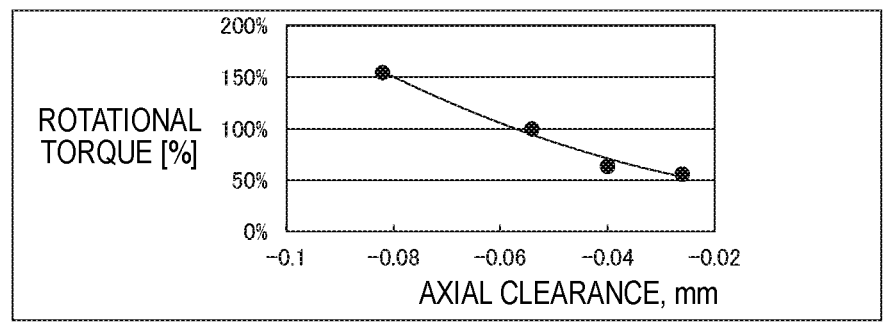
FIG. 14 is a graph illustrating a relationship between the axial clearance and the rotational torque.

FIG. 14 is a graph illustrating the relationship between the axial clearance and the rotational torque. The rotational torque in this case corresponds to a contact torque when the inner shaft is rotated with the outer ring fixed. As can be seen from the drawing, the larger the axial clearance, the smaller the rotational torque of the hub unit 10 is. As described above, the hub unit 10 of the embodiment can increase the axial clearance as compared with a hub unit of the related art. Specifically, the axial clearance can be increased to −0.015 mm. As a result, in the hub unit 10 of the embodiment, it is also possible to suppress the rotational torque even when the allowable range of the axial clearance is expanded.

Figure 15:
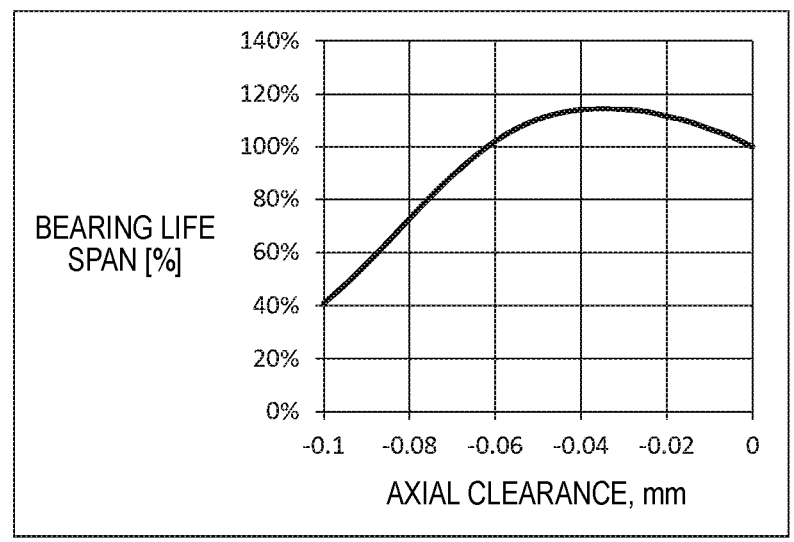
FIG. 15 is a graph illustrating a relationship between the axial clearance and a bearing life span.

FIG. 15 is a graph illustrating the relationship between the axial clearance and the bearing life span. Compared with a state where the axial clearance is 0 (bearing life span: 100%), the bearing life span (that is, the life span of the hub unit) becomes longer as the axial clearance becomes smaller than 0. This is due to the fact that the rigidity of the hub unit becomes high due to the smaller axial clearance. However, the bearing life span (that is, the life span of the hub unit) is gradually reduced as the axial clearance becomes further smaller.

As illustrated in the drawing, when the axial clearance is reduced to −0.1 mm, the bearing life span becomes about 40% as compared with a case where the axial clearance is 0. Therefore, it is desirable that the axial clearance is set to be equal to or greater than −0.1 mm. As illustrated in the drawing, when the axial clearance exceeds −0.065 mm, a reduction in the bearing life span can be suppressed to about 3% to 5% as compared with a case where the axial clearance is zero. Therefore, preferably, it is desirable that the axial clearance is set to be equal to or greater than −0.065 mm.

As described above, in the hub unit 10 of the embodiment, it is possible to increase the axial clearance to −0.015 mm by adjusting the contact angles of the rolling elements 41 and 42. Therefore, the hub unit 10 of the embodiment preferably has an axial clearance of −0.1 mm or more and −0.015 mm or less. More preferably, the hub unit 10 of the embodiment has an axial clearance of −0.065 mm or more and −0.015 mm or less. Further, from the viewpoint of reducing the rotational torque, it is preferable that the axial clearance be set to be in the range of −0.035 mm to −0.015 mm.

[Effect]

In the hub unit 10 according to the embodiment, the contact angle $\theta 1$ of the first rolling element 41 on the inner side is set to be smaller than 37° and the contact angle $\theta 2$ of the second rolling element 42 on the outer side is set to be larger than 37°. In this way, as described above, it is possible to improve the rigidity of the hub unit 10 while suppressing an increase in the rotational torque.

The hub unit 10 of the embodiment preferably has an axial clearance of −0.1 mm or more and −0.015 mm or less. As a result, it is possible to satisfy the requirement for the life span of the hub unit and improve the rigidity of the hub unit. More preferably, the hub unit 10 of the embodiment has an axial clearance of −0.065 mm or more and −0.015 mm or less. Therefore, the life span of the hub unit can be kept high and the rigidity of the hub unit can be improved.

Although the embodiment is described above, the present disclosure is not limited to the embodiment described above and various modifications are possible without departing from the spirit of the invention.

REFERENCE SIGNS LIST

10: hub unit
1: outer ring
131: first outer raceway surface
132: second outer raceway surface
2: inner shaft
3: inner ring
7: suspension device
8: dust cover
9: brake disk
31: first inner raceway surface
232: second inner raceway surface
41: first rolling element
42: second rolling element
100: assembly

The invention claimed is:

1. A hub unit which is attached to a vehicle, comprising:
   an outer ring which includes:
      a first outer raceway surface and a second outer raceway surface formed in an inner peripheral surface of the outer ring, the second outer raceway surface being disposed further on an outer side than the first outer raceway surface in a vehicle width direction in a state where the hub unit is attached to the vehicle, and
      a flange;
   an inner shaft which is disposed coaxially with the outer ring on an inner periphery of the outer ring and to which a wheel is attached at an outer side in the vehicle width direction; and an inner ring which is press-fitted to an inner side of the inner shaft in the vehicle width direction, wherein:

the inner ring includes a first inner raceway surface corresponding to the first outer raceway surface on an outer peripheral surface, the inner shaft includes a second inner raceway surface corresponding to the second outer raceway surface on the outer peripheral surface, the hub unit further includes a plurality of first rolling elements which are disposed in a bearing space formed between the outer ring and the inner shaft on which the inner ring is mounted and are in contact with the first outer raceway surface and the first inner raceway surface at a first contact angle smaller than 37°, and a plurality of second rolling elements which are disposed in the bearing space and are in contact with the second outer raceway surface and the second inner raceway surface at a second contact angle larger than 37°, the first contact angle is an angle formed between:

(i) a first plane that passes through a center of each of the plurality of first rolling elements and extends perpendicular to an axial direction of the hub unit, and (ii) a first inclined line that passes through: (a) a contact point between the first outer raceway surface and a respective first rolling element, and (b) the center of the respective first rolling element, the second contact angle is an angle formed between:

(i) a second plane that passes through a center of each of the plurality of second rolling elements and extends perpendicular to the axial direction of the hub unit, and (ii) a second inclined line that passes through: (a) a contact point between the second outer raceway surface and a respective second rolling element, and (b) the center of the respective second rolling element, the flange is disposed entirely axially outside an inner region of the outer ring that is defined by the first inclined line and the second inclined line, a single body of the outer ring includes the first outer raceway surface, the second outer raceway surface, and the flange, and an axial clearance determined by an extent of pressing of the inner ring against the inner shaft is set to be in a range of −0.1 mm or more and −0.015 mm or less.

2. The hub unit according to claim 1, wherein an axial clearance determined by an extent of pressing of the inner ring against the inner shaft is set to be in a range of −0.065 mm or more and −0.015 mm or less.

3. The hub unit according to claim 1, wherein:

an inner-side end portion of an inner shaft main body of the inner shaft is caulked radially outward and is in contact with an inner-side end surface of the inner ring, and a step portion of the inner shaft main body of the inner shaft is in contact with an outer-side end surface of the inner ring.

4. The hub unit according to claim 1, wherein the first inclined line is inclined in a direction toward the plurality of second rolling elements with respect to the first plane.

5. The hub unit according to claim 1, wherein an axial inner-side end portion of the inner shaft in the vehicle width direction is caulked radially outward and is in contact with an axial inner-side end surface of the inner ring, and an axial inner-side end portion of the bearing space is sealed by a cap extending between the outer ring and the inner ring so as to cover the axial inner-side end portion of the inner shaft.

* * * * *